(12) United States Patent
Ogawa et al.

(10) Patent No.: US 7,144,244 B1
(45) Date of Patent: Dec. 5, 2006

(54) MOLDING MACHINES

(75) Inventors: Masanori Ogawa, Toyota (JP); Takashi Yumiketa, Toyota (JP); Eiji Kitai, Toyota (JP)

(73) Assignees: Kojima Press Industry Co., Ltd., Toyota (JP); Tekunohama Co., Ltd., Toyota (JP)

( * ) Notice: Subject to any disclaimer, the term of this patent is extended or adjusted under 35 U.S.C. 154(b) by 0 days.

(21) Appl. No.: 11/189,246

(22) Filed: Jul. 26, 2005

(51) Int. Cl.
*B28B 3/00* (2006.01)

(52) U.S. Cl. ............... 425/408; 425/406; 425/388; 425/390; 425/422

(58) Field of Classification Search ........... 425/406, 425/388, 390, 408, 422
See application file for complete search history.

(56) References Cited

U.S. PATENT DOCUMENTS

| 4,243,456 | A * | 1/1981 | Cesano ............... 156/214 |
| 6,189,589 | B1 * | 2/2001 | Tokunaga et al. ........ 156/497 |
| 2003/0155685 | A1 * | 8/2003 | Spengler et al. .......... 264/250 |

FOREIGN PATENT DOCUMENTS

| EP | 0547703 | | 6/1993 |
| GB | 564126 | * | 9/1944 |
| JP | 63-91224 | | 4/1988 |
| JP | 5-78530 | | 10/1993 |
| JP | 6-144669 | | 5/1994 |
| JP | 6-270365 | | 9/1994 |
| JP | 6-328485 | | 11/1994 |
| JP | 2000-326328 | | 11/2000 |
| JP | 2001-58536 | | 3/2001 |
| JP | 2001-328099 | | 11/2001 |
| JP | 2002-144413 | | 5/2002 |
| JP | 2003-25318 | | 1/2003 |
| JP | 2005-231109 | * | 9/2005 |
| WO | 99/64221 | | 12/1992 |

OTHER PUBLICATIONS

European Search Report for Application No. 0509022.0-2307 dated Jan. 20, 2006.
Patent Abstracts of Japan Vo. 011, No. 196 (M-601), Jun. 24, 1987, JP 62 019430, Database WPI Week 198710 Derwent Publications Ltd.

* cited by examiner

*Primary Examiner*—Joseph S. Del Sole
*Assistant Examiner*—Maria Veronica D. Ewald
(74) *Attorney, Agent, or Firm*—Conley Rose, P.C.

(57) ABSTRACT

A molding machine (1) may include first and second dies (13, 23) arranged and constructed to be closed and opened, and first and second trimming members (17, 27) arranged and constructed to engage with each other after the first and second dies are closed. When the first and second dies (13, 23) are closed, a resin based sheet material (S') is pressed so as to form a molded material (S). When the first and second trimming members (17, 27) engage with each other, the molded material (S) is circumferentially trimmed so as to produce a molded article (Sa) and a waste strip (Sb).

12 Claims, 6 Drawing Sheets

MOLDING MACHINES

BACKGROUND OF THE INVENTION

1. Field of the Invention

The present invention relates to molding machines for manufacturing a molded article from a sheet material.

2. Description of the Related Art

A known method for manufacturing a molded article is taught, for example, by Japanese Laid-open Patent Publication Number 2002-144413. In this known art, a sheet material is placed between upper and lower dies of a molding machine. Thereafter, the upper die is lowered by a predetermined distance toward the lower die so that a punch associated with the upper die is engaged with a corresponding die recess defined in the lower die (i.e., a press molding step). As a result, the sheet material is press molded so as to form a molded material. Subsequently, the upper die is further lowered toward the lower die so that a heated cutter blade associated with the upper die contacts the periphery of the molded material (i.e., a trimming step). As a result, the molded material is circumferentially cut or trimmed by heat from the cutter blade so that a waste is removed therefrom. Thus, a molded article is manufactured.

According to this known method, the trimming step can be performed substantially simultaneous with the press molding step in the molding machine. That is, the trimming step can be performed in the molding machine without using a special trimming machine.

SUMMARY OF THE INVENTION

It is, accordingly, one object of the present invention to provide improved machines for manufacturing molded articles.

In one embodiment of the present invention, a molding machine may include first and second dies arranged and constructed to be closed and opened, and first and second trimming members arranged and constructed to engage with each other after the first and second dies are closed. When the first and second dies are closed, a resin based sheet material is pressed so as to form a molded material. When the first and second trimming members engage with each other, the molded material is circumferentially trimmed so as to produce a molded article and a waste strip.

According to the present invention, the molded material is circumferentially trimmed by the first and second trimming members that are disposed in the molding machine, so that the molded article is produced. That is, the molding machine includes a trimming mechanism that can trim the molded material so as to produce the molded article. Therefore, it is not necessary to use an additional or special trimming machine in order to trim the molded material. Consequently, the molded article can be efficiently or speedily manufactured. This may lead to the minimization of manufacturing costs of the molded article.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention is shown in FIGS. 1 to 6.

Figure 3:
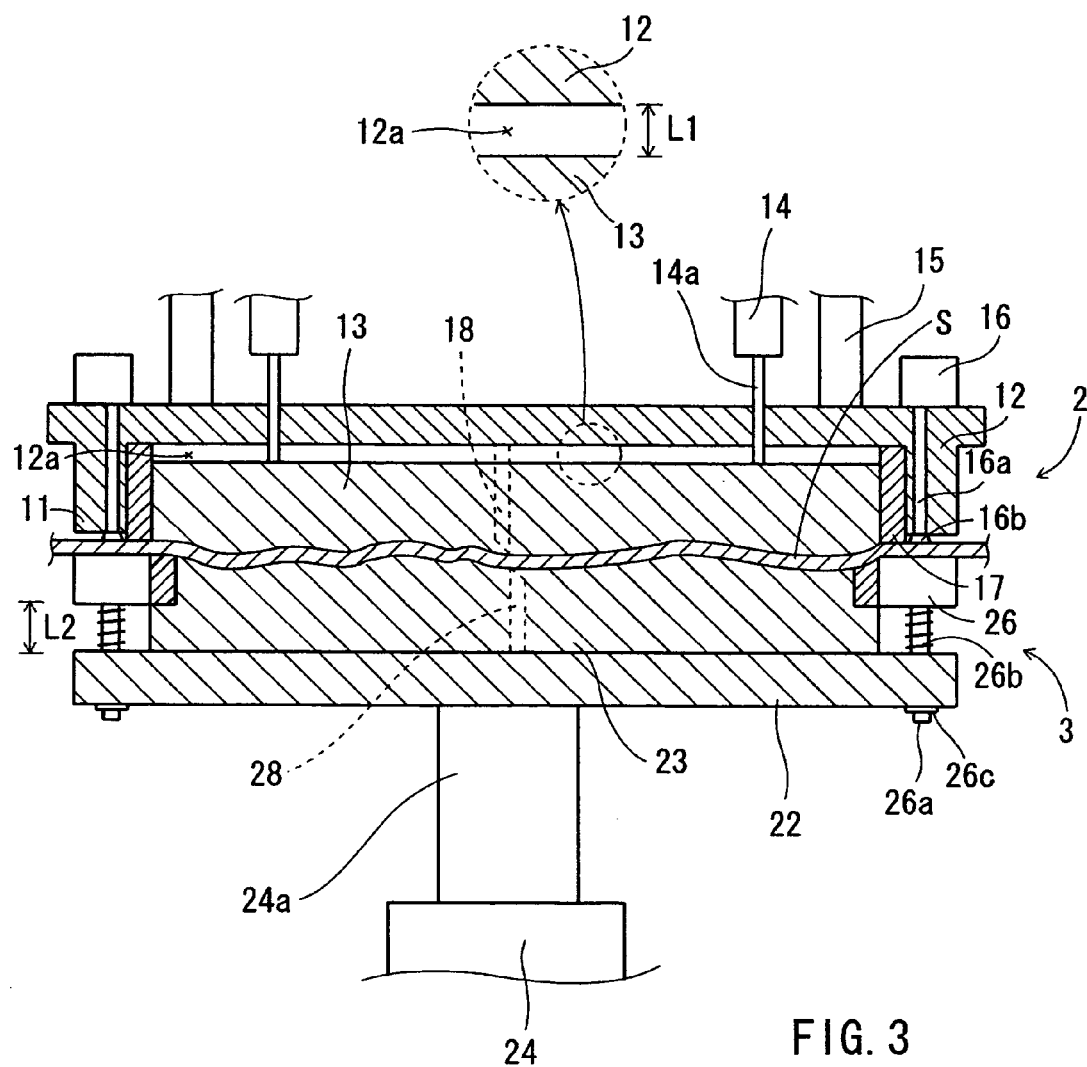
FIG. 3 is an enlarged side cross-sectional view of the upper and lower die units, illustrating a condition in which the sheet material is press molded in order to form a molded material.
Figure 4:
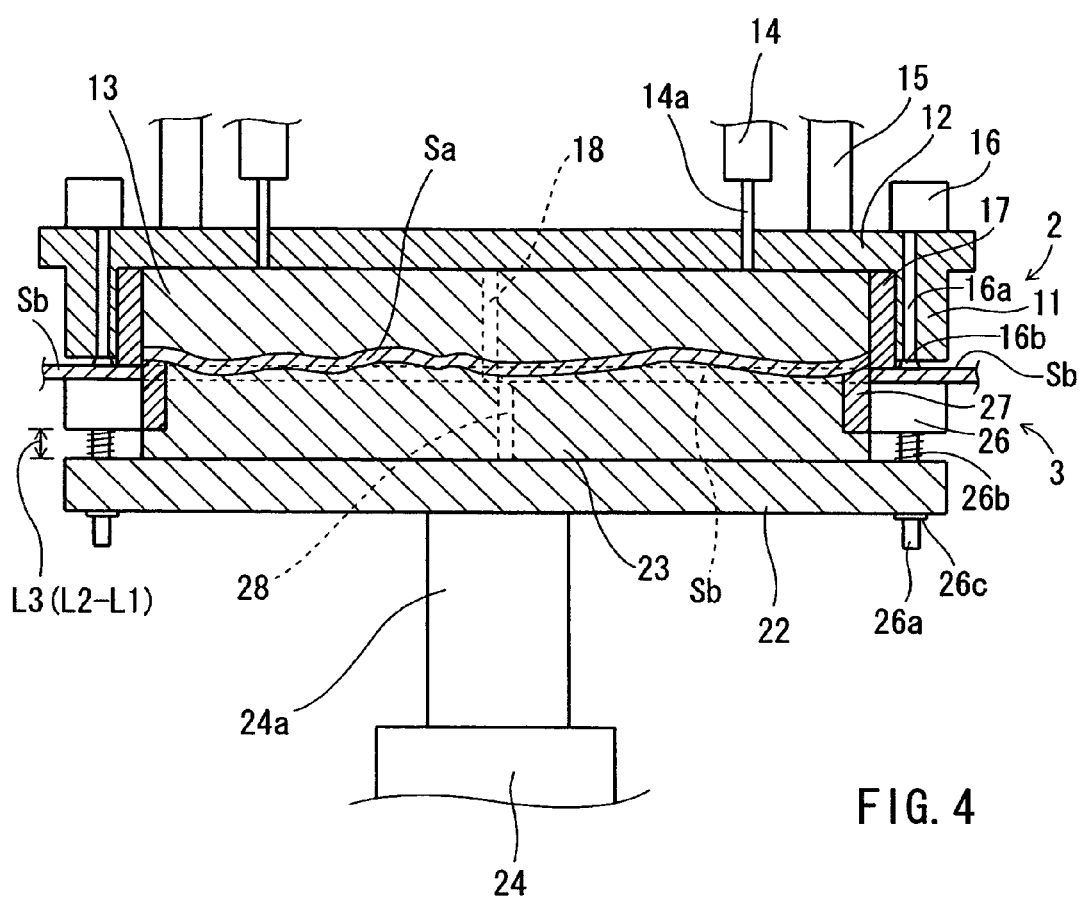
FIG. 4 is an enlarged side cross-sectional view of the upper and lower die units, illustrating a condition in which the molded material is cut or trimmed in order to form a molded article and a waste strip.
Figure 5:
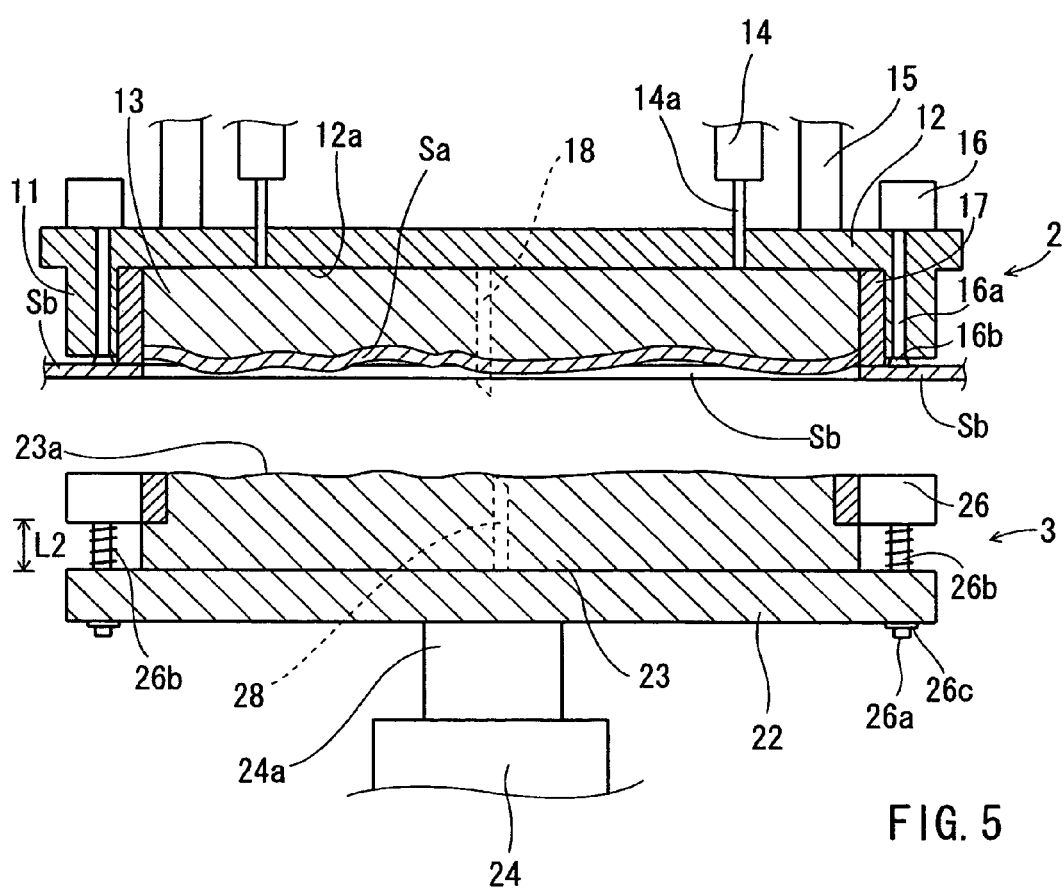
FIG. 5 is an enlarged side cross-sectional view of the upper and lower die units, illustrating a condition in which the upper and lower dies are reopened so that the molded article is retained.
Figure 6:
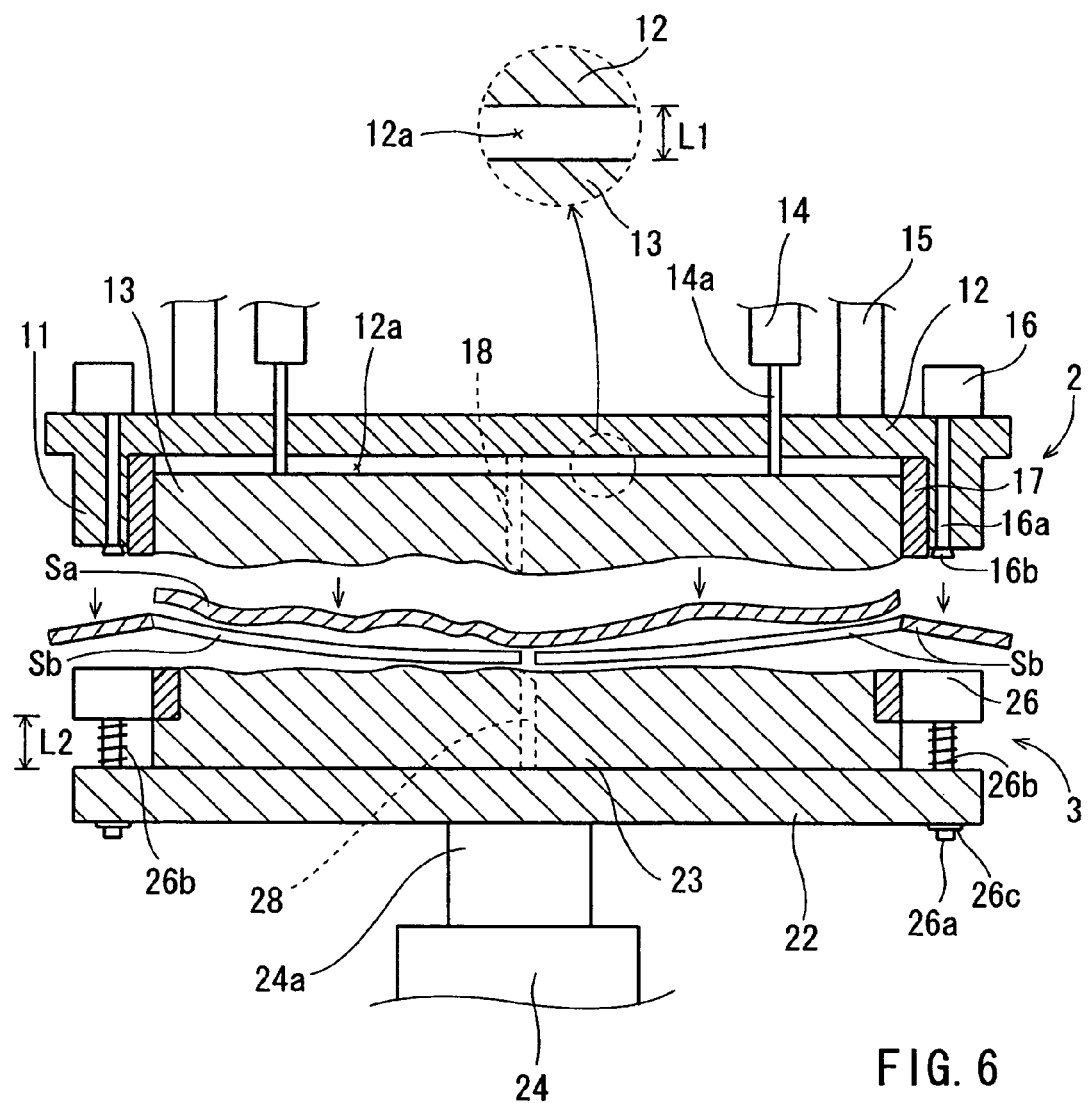
FIG. 6 is an enlarged side cross-sectional view of the upper and lower die units, illustrating a condition in which the molded article and the waste strip are released from the upper and lower dies.

A molding machine 1 is intended to press a sheet material S' (FIGS. 1 and 2) in order to form a molded material S (FIG. 3), and then to trim the molded material S in order to produce a molded article Sa and a waste strip Sb (FIGS. 4–6). Further, the sheet material S' may preferably be a resin based sheet material.

Figure 1:
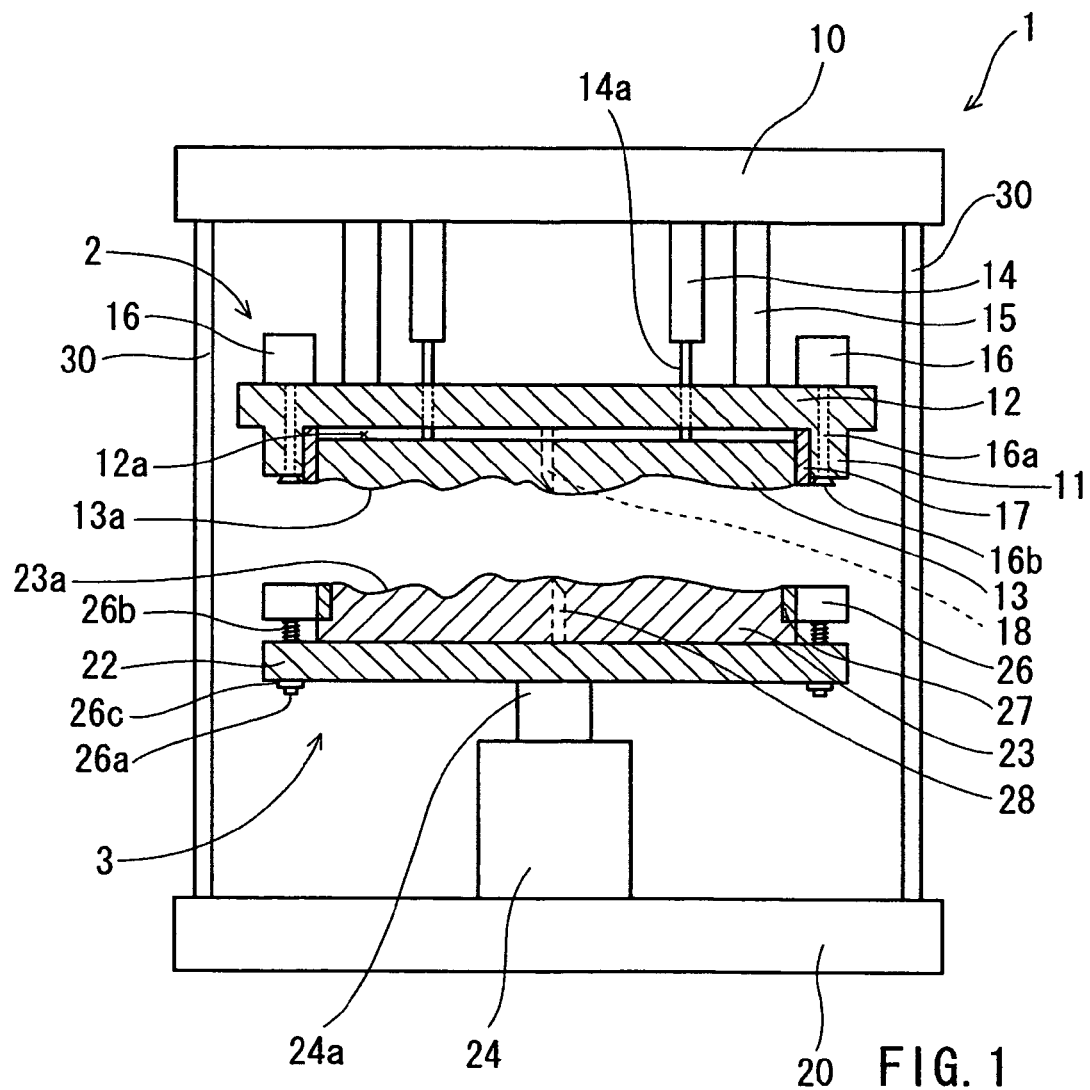
FIG. 1 is a side cross-sectional view of a molding machine according to one representative embodiment of the present invention.

As shown in FIG. 1, the molding machine 1 may include an upper or first lateral frame 10 and a lower or second lateral frame 20 that are interconnected via vertical support members 30. Also, the molding machine 1 may include an upper or first die unit 2 that is associated with the upper frame 10, and a lower or second die unit 3 that is associated with the lower frame 20.

The upper die unit 2 is essentially composed of an upper or first base member 12, and an upper or first die 13 having an upper molding surface 13a that corresponds to the molded article Sa. The upper base member 12 has an annular wall 11 and a downwardly directed recess 12a that is defined within the annular wall 11. The upper base member 12 thus constructed is attached to the upper frame 10 via a plurality of (e.g., two) vertical attachment members 15. The upper die 13 is vertically movably received within the recess 12a of the upper base member 12. Also, the upper die unit 2 includes a plurality of (e.g., two) hydraulic cylinders 14 that are vertically attached to the upper frame 10. Each of the hydraulic cylinders 14 has a cylinder rod 14a which is vertically movably received in a through bore (not shown) formed in the base member 12. As will be apparent, the cylinder rod 14a downwardly extends through the base member 12 and is connected to the upper die 13. Further, the hydraulic cylinders 14 may preferably be arranged and constructed such that a clearance having a distance L1 (e.g., FIG. 2) is normally formed between the upper base member 12 and the upper die 13.

The lower die unit 3 is essentially composed of a lower or second base member 22, and a lower or second die 23 having a lower molding surface 23a that corresponds to the molded article Sa. The lower die 23 is seated on lower base member 22. Also, the second die unit 3 includes a drive hydraulic cylinder 24 that is vertically disposed on and fixed to the lower frame 20. The hydraulic cylinder 24 has a cylinder rod 24a upwardly extending therefrom. The cylinder rod 24a is connected to the lower base member 22 so as to vertically move the same. As will be appreciated, when the hydraulic cylinder 24 is actuated, the lower base member 22 is vertically moved toward and away from the upper base member 12 via the cylinder rod 24a so that the upper and lower dies 13 and 23, respectively associated with the upper and lower base members 12 and 22, can be closed and opened.

The upper die unit 2 further includes an annular upper trimmer blade 17 (i.e., a first trimming member) that is attached to the upper base member 12 so as to be movably associated with the upper die 13. The upper trimmer blade 17 is intended to circumferentially trim the molded material S, thereby producing the molded article Sa and the waste strip Sb. The upper trimmer blade 17 may preferably be disposed within the recess 12a of the upper base member 12 so as to extend around the upper die 13. The upper die unit 2 additionally includes a plurality of (e.g., two) upper cutter blades 18 (i.e., a first cutting member) (one of which is shown) that is attached to the upper base member 12. The upper cutter blades 18 are intended to sever the waste strip Sb. The upper cutter blades 18 may preferably be positioned around the upper die 13 so as to be spaced apart from each other at a desired interval.

Similarly, the lower die unit 3 further includes an annular lower trimmer blade 27 (i.e., a second trimming member) that is attached to the lower die 23. The lower trimmer blade 27 is arranged and constructed to engage the upper trimmer blade 17 when the lower base member 22 is further moved toward the upper base member 12 after the upper and lower dies 13 and 23 are closed. The lower trimmer blade 27 may preferably be fitted to the lower die 23 so as to extend along an upper periphery of the lower die 23. The lower die unit 3 additionally includes a plurality of (e.g., two) lower cutter blades 28 (i.e., a second cutting member) (one of which is shown) that is attached to the lower base member 22. The lower cutter blades 28 are arranged and constructed to engage the upper cutter blade 18 when the lower base member 22 is further moved toward the upper base member 12 after the upper and lower dies 13 and 23 are closed. That is, the lower cutter blades 28 may preferably be positioned around the lower die 23 so as to correspond to the upper cutter blade 18.

The upper die unit 2 includes a plurality of (e.g., two) suction pumps 16 (i.e., a suction device) that is attached to the upper base member 12. Each of the suction pumps 16 includes a suction duct 16a that downwardly extends through the annular wall 11 of the upper base member 12, and a suction port 16b that opens at the end surface of the annular wall 11.

Conversely, the lower die unit 3 includes a plurality of (e.g., two) elongated block-shaped support members 26 for supporting a periphery of the sheet material S'. Each of the support members 26 may preferably be positioned so as to be closely adjacent to the lower trimmer blade 27 attached to the lower die 23. The support member 26 thus positioned is vertically movably attached to the lower base member 22 via a support shaft 26a having an elastic member 26b (e.g., a spring, rubber, or other such member) and an adjuster nut 26c. That is, the support member 26 is connected to the support shaft 26a, which is inserted into a through bore (not shown) formed in the lower base member 22. The elastic member 26b is interleaved between the support member 26 and the lower base member 22 so that the support member 26 can be normally upwardly biased. Further, the elastic member 26b may preferably be adjusted by the adjuster nut 26c such that a clearance having a distance L2 (e.g., FIG. 2) is normally formed between the support member 26 and the lower base member 22. Preferably, the elastic member 26b may be adjusted such that the upper surface of the support member 26 can be coplanar with the lower molding surface 23a of the lower die 23.

The support members 26 may preferably be disposed so as to respectively vertically align with the suction ports 16b of the suction pumps 16. Therefore, when the upper and lower dies 13 and 23 are closed, the periphery of the sheet material S' can be supported from the under side via the support members 26 and can be applied with a suction force from the upper side via the suction pumps 16. Thus, when the upper and lower dies 13 and 23 are closed, the periphery of the sheet material S' can be substantially horizontally positioned and reliably supported. As a result, the sheet material S' can be smoothly press molded without wrinkling so as to produce the wrinkle free molded material S (the wrinkle free molded article Sa).

Generally, each of the upper and lower die 13 and 23 may preferably be provided with a cooling mechanism (not shown) such as tubing for supplying a coolant (i.e., water or air).

Representative methods for manufacturing the molded article Sa using this molding machine 1 will now be described.

Figure 2:
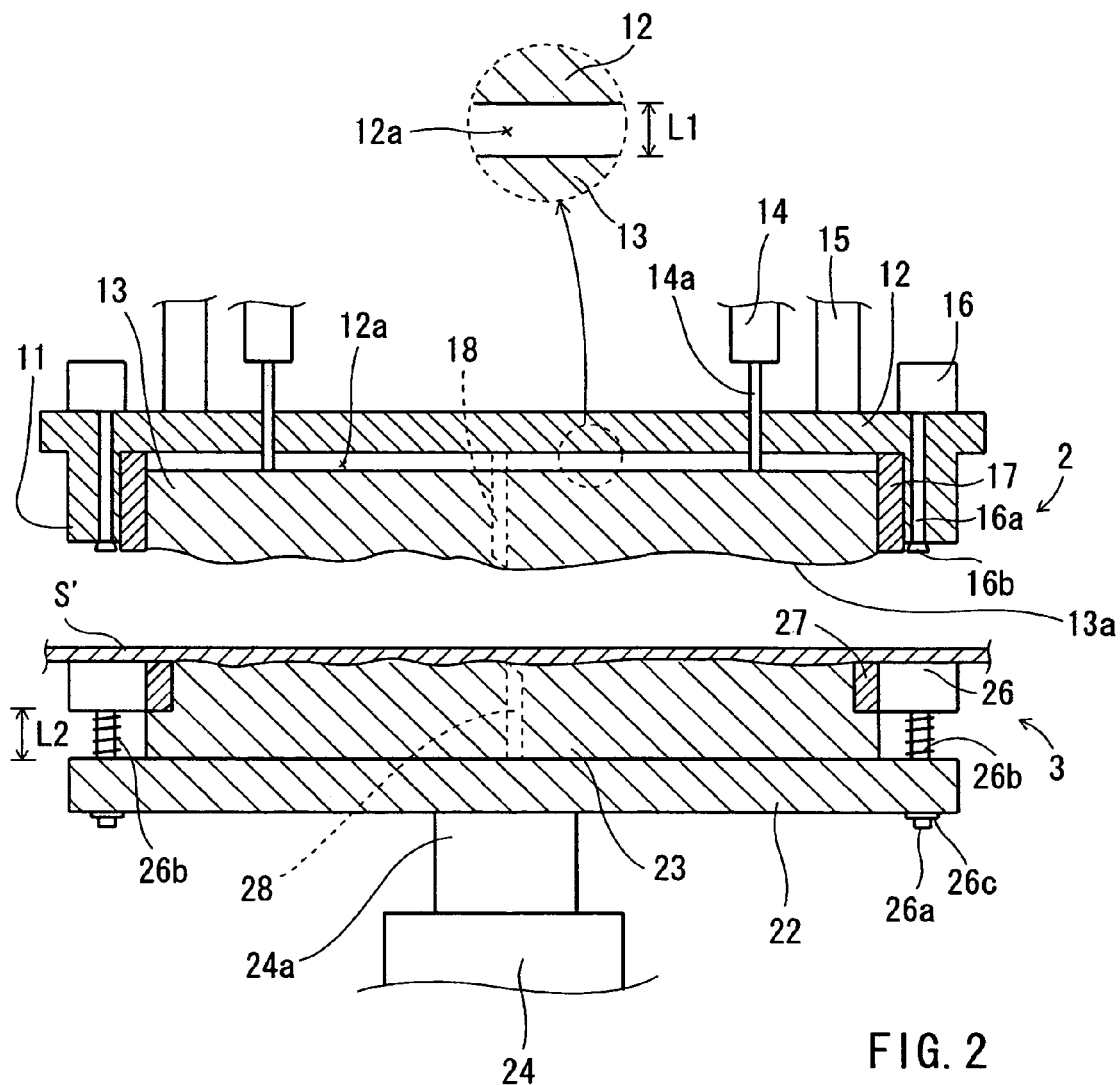
FIG. 2 is an enlarged side cross-sectional view of upper and lower die units of the molding machine, illustrating a condition in which a sheet material is fed between upper and lower dies of the upper and lower die units.

First, as shown in FIG. 2, the sheet material S' is fed into a space between the upper and lower dies 13 and 23 via a conveyer (not shown). As will be recognized, the sheet material S' has an external size greater than the external size of the lower molding surface 23a of the lower die 23. The fed sheet material S' is then disposed on the lower die 23 such that the periphery of the sheet material S' is protruded outwardly from the lower molding surface 23a of the lower die 23. Thus, the sheet material S' is disposed on the lower die 23 such that the periphery of the sheet material S' is supported by the support members 26.

Thereafter, the hydraulic cylinder 24 is actuated so that the lower base member 22 is upwardly moved toward the upper base member 12. As a result, as shown in FIG. 3, the upper and lower dies 13 and 23 respectively associated with the upper and lower base members 12 and 22 are closed so that the sheet material S' is press molded, thereby forming the molded material S. At this time, the periphery of the molded material S may reliably be clamped between the annular wall 11 of the upper base member 12 and the support members 26 of the lower die unit 3. Also, at the same time, the suction pumps 16 of the upper die unit 2 are actuated so that the periphery of the molded material S is pulled toward the end surface of the annular wall 11 of the upper base member 12 by a suction force of the suction pump 16. Thus, the periphery of the sheet material S' can be reliably supported. Therefore, the sheet material S' can be molded into the molded material S without wrinkling. Further, when the upper and lower dies 13 and 23 are closed, the hydraulic cylinders 14 of the upper die unit 2 may preferably be actuated such that the distance L1 of the clearance formed between the upper base member 12 and the upper die 13 can be maintained.

Subsequently, the hydraulic cylinders 14 of the upper die unit 2 are deactuated while the hydraulic cylinder 24 is continuously actuated. As a result, as shown in FIG. 4, the lower base member 22 is further upwardly moved toward the upper base member 12 by the hydraulic cylinder 24 so that the closed upper and lower dies 13 and 23 are pushed into the recess 12a of the upper base member 12 together with the molded material S until the clearance formed between the upper base member 12 and the upper die 13 is closed (i.e. until the upper die 13 reaches an uppermost position within the recess 12a of the upper base member 12). As shown in FIG. 4, at this time, the lower trimmer blade 27 of the lower die unit 3 engages the upper trimmer blade 17 of the upper die unit 2 so that the molded material S is circumferentially trimmed, thereby producing the molded article Sa and the waste strip Sb. Simultaneously, the lower cutter blades 28 of the lower die unit 3 engage the upper cutter blades 18 of the upper die unit 2, thereby cutting the waste strip Sb. As will be recognized, when the lower base member 22 is upwardly moved toward the upper base member 12, the support members 26 of the lower die unit 3 are pushed down relative to the upper and lower dies 12 and 23 because the support members 26 are prevented from moving upwardly by means of the annular wall 11 of the upper base member 12. Therefore, the distance L2 of the clearance that is formed between each of the support members 26 and the lower base member 22 is reduced to a distance L3 (which corresponds to L2 minus L1). Thus, when the molded material S is trimmed, the periphery of the molded material S can be reliably clamped between the annular wall 11 of the upper base member 12 and the support members 26 of the lower die unit 3. Therefore, the molded material S can be trimmed without wrinkling. As a result, the produced molded article Sa may have a good wrinkle free appearance.

Subsequently, the hydraulic cylinder 24 is deactuated so that the lower base member 22 is lowered. As a result, as shown in FIG. 5, the upper and lower dies 13 and 23 are reopened. As will be apparent from FIG. 5, at this time, the upper die 13 is retained in the uppermost position within the recess 12a of the upper base member 12 because the hydraulic cylinders 14 of the upper die unit 2 are still deactuated. Therefore, the molded article Sa is retained on the upper die 13 by a frictional force between the molded article Sa and the upper trimmer blade 17. Conversely, the waste strip Sb is retained on the end surface of the annular wall 11 of the upper base member 12 by the suction force of the suction pump 16.

Thereafter, the hydraulic cylinders 14 of the upper die unit 2 are actuated again to move the upper die 13 downwardly such that the clearance having the distance L1 is formed again between the upper base member 12 and the upper die 13. As a result, as shown in FIG. 6, the molded article Sa retained on the upper die 13 is released therefrom. Subsequently, the suction pumps 16 of the upper die unit 2 are deactuated so that the cut waste strip Sb is released from the end surface of the annular wall 11 of the upper base member 12. Thus, the molded article Sa can be manufactured using this molding machine 1.

Upon completion of the formation of the molded article Sa, the manufacturing process is repeated in the same manner as described above.

Various changes and modifications may be made to the representative embodiment without departing from the scope of the present invention. For example, in this embodiment, the lower base member 22 is designed to be upwardly moved by the hydraulic cylinder 24 in the representative embodiment. However, the upper base member 12 can be designed to be downwardly moved by the hydraulic cylinder 24, if necessary.

The invention claimed is:

1. A molding machine, comprising:
   first and second dies arranged and constructed to be closed and opened; and
   first and second trimming members arranged and constructed to engage with each other after the first and second dies are closed,
   wherein the first die is arranged and constructed to move relative to the first trimming member after the first and second dies are closed, wherein when the first and second dies are closed, a resin based sheet material is pressed so as to form a molded material, wherein when the first die is moved relative to the first trimming member together with the second die, the first and second trimming members engage with each other and circumferentially trim the molded material so as to produce a molded article and a waste strip, and wherein the first trimming member and the first die are arranged and constructed such that the produced molded article can be retained on the first die by means of the first trimming member when the first and second dies are opened.

2. The molding machine as defined in claim 1 further comprising first and second cutting members arranged and constructed to engage with each other after the first and second dies are closed, wherein when the first and second cutting member engage with each other, the waste strip is cut into segments.

3. The molding machine as defined in claim 1 further comprising a suction device arranged and constructed to retain a periphery of the molded material by a suction force thereof.

4. The molding machine as defined in claim 3 further comprising a support member arranged and constructed to support the periphery of the molded material, and wherein the support member aligns with the suction device.

5. A molding machine, comprising:
   a first base member;
   a second base member arranged and constructed to move toward and away from the first base member;
   a first die moveably connected to the first base member;
   a second die connected to the second base member;
   a first trimming member attached to the first base member; and
   a second trimming member attached to the second die;
   wherein when the second base member is moved toward the first base member, the first and second dies close so that a sheet material is pressed so as to form a molded material, wherein the first die is arranged and constructed to move relative to the first trimming member after the first and second dies are closed, wherein when the second base member is further moved toward the first base member, the first die moves relative to the first trimming member together with the second die such that the first and second trimming members engage with each other, thereby circumferentially trimming the molded material so as to produce a molded article and a waste strip, and wherein the first trimming member is associated with the first die and is arranged and constructed such that the produced molded article can be retained on the first die by means of the first trimming member when the first and second dies are opened.

6. The molding machine as defined in claim 1, further comprising means for clamping the periphery of the resin based sheet material that extends beyond said trimming members.

7. The molding machine as defined in claim 5, further comprising an annular wall extending from said first base member outside said first trimming member and a resiliently mounted support member supported on said second base member such that when said first and second dies are closed, the periphery of the molded material is clamped between said annular wall and said support member.

8. The molding machine as defined in claim 1, further comprising actuable means for moving the first die relative to the trimming member when the first and second dies are open.

9. The molding machine as defined in claim 1, further comprising a hydraulic cylinder for moving the first die relative to the trimming member when the first and second dies are open.

10. A molding machine, comprising:
a first base member;
a second base member arranged and constructed to move toward and away from the first base member;
a first die moveably connected to the first base member;
a second die connected to the second base member;
a first trimming member attached to the first base member;
a second trimming member attached to the second die; and
actuable means for moving the first die relative to the first base member;
wherein when the second base member is moved toward the first base member, the first and second dies close so that a sheet material is pressed so as to form a molded material,
wherein when the second base member is further moved toward the first base member and the actuable means are deactivated, the first die moves relative to the first trimming member together with the second die such that the first and second trimming members engage with each other, thereby circumferentially trimming the molded material so as to produce a molded article and a waste strip; and
wherein the first die retains its position relative to the first trimming member when the first and second dies are opened; and
wherein the actuable means moves the first die relative to the first trimming member so as to release the waste strip after the first and second dies are opened.

11. The molding machine as defined in claim 10 wherein the first trimming member is arranged and constructed such that the produced molded article is retained on the first die by means of the first trimming member when the first and second dies are opened.

12. The molding machine as defined in claim 10 wherein the actuable means comprises a hydraulic cylinder.

* * * * *